United States Patent

Le Goff

[15] 3,703,661

[45] Nov. 21, 1972

[54] GENERATOR FOR DELIVERING VERY-HIGH-VOLTAGE SQUARE-TOPPED PULSES

[72] Inventor: Denis Le Goff, 36, Enghien, France

[73] Assignee: Commissariat A L'Energie Atomique, Paris, France

[22] Filed: May 24, 1971

[21] Appl. No.: 146,131

[30] Foreign Application Priority Data

May 28, 1970 France..........................7019553

[52] U.S. Cl. ..................315/155, 307/108, 315/159, 315/240, 320/1, 328/61, 328/63, 350/160 R

[51] Int. Cl. ..........................H01t 15/00, H03k 3/53

[58] Field of Search ......331/127, 131; 315/149, 155, 315/159, 240, 245; 350/150, 160 R; 320/1; 307/108, 109; 328/59–61, 63

[56] References Cited

UNITED STATES PATENTS

| | | | |
|---|---|---|---|
| 3,398,322 | 8/1968 | Guenther | 315/155 X |
| 3,517,256 | 6/1970 | Barbini | 315/155 |
| 3,518,436 | 6/1970 | De Maria et al. | 350/160 R X |
| 3,519,328 | 7/1970 | Grossman | 350/160 R X |

*Primary Examiner*—Robert Segal
*Assistant Examiner*—Siegfried H. Grimm
*Attorney*—Cameron, Kerkam & Sutton

[57] ABSTRACT

A square-topped voltage pulse having a very fast rise time and fall time is obtained between the two terminals of a load by means of a generator comprising a first and a second voltage source which remain connected to the two terminals and two devices for rapid circuit-closure which are connected between ground and said terminals and at least one of which consists of a spark-gap, said two terminals being connected to ground in succession.

5 Claims, 1 Drawing Figure

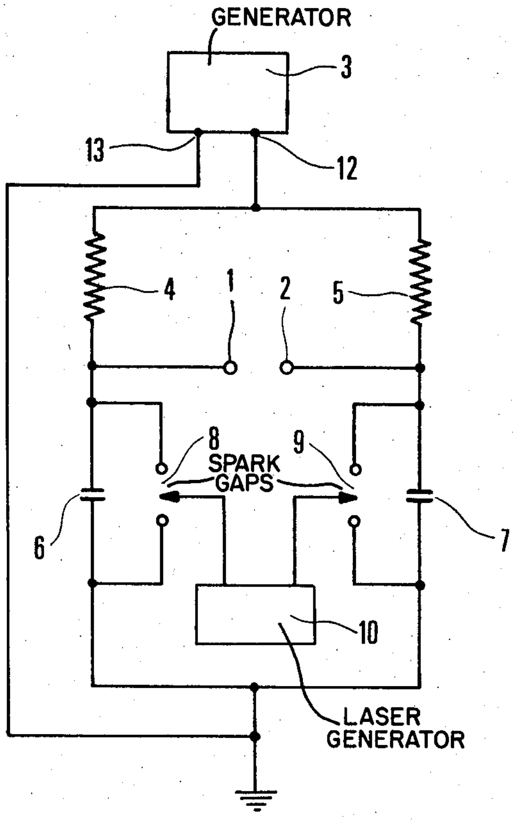
GENERATOR
3
13
12
4
1
2
5
8
9
SPARK
GAPS
6
7
10
LASER
GENERATOR

GENERATOR FOR DELIVERING VERY-HIGH-VOLTAGE SQUARE-TOPPED PULSES

This invention relates to a generator for producing very-high-voltage square-topped pulses which will be referred-to hereinafter as VHV pulses.

In certain fields of science and technology and especially in electrooptics, it is sometimes necessary to make provision for generators which are capable of delivering voltage pulses of substantial height which have very steep leading edges and trailing edges. By way of example, square-topped pulses of several thousand volts are necessary to control electrooptical cells such as Pockels or Kerr cells.

There is not known to exist any generator which is capable of emitting VHV pulses having the following characteristics:

- a pulse rise time and a pulse fall time of the order of a few nanoseconds;
- a plateau of adjustable duration which can vary between a few nanoseconds and a few hundreds of microseconds.

The aim of this invention is to produce a novel VHV pulse generator which makes it possible to satisfy these requirements.

This invention is directed to a method for obtaining between two terminals of a load a square-topped voltage pulse having a very fast rise time and fall time; the essential feature of said method primarily consists in connecting said two terminals to ground in succession, said terminals being connected respectively to one of the terminals of a first and of a second constant-potential source.

This invention is also directed to a generator for producing VHV square-topped pulses which are applicable to two terminals of a load, said generator being primarily distinguished by the fact that it comprises a first voltage source, first means for connecting the two terminals of said first source to a first terminal of said load, a first controllable device associated with said first connection means and permitting a variation by a predetermined quantity in the voltage applied to said first terminal, a second voltage source, second means for connecting the two terminals of said second source to the second terminal of said load in order that the voltage applied to said second terminal should have the same value as the voltage applied to said first terminal, a second controllable device associated with said second connection means for varying the voltage applied to said second terminal to an extent which is equal to said predetermined quantity.

Further characteristic features and advantages of the invention will become apparent from the following description, reference being made to the single accompanying FIGURE which is given by way of illustration but not in any limiting sense. This FIGURE shows a preferential example of construction of a VHV pulse generator as intended for carrying out the method according to the invention and applicable to the two terminals 1 and 2 of a capacitive load which is not illustrated in the figure.

The VHV pulse generator comprises a direct-current voltage source 3, one terminal 12 of which is connected to each terminal 1 and 2 by suitable connection means which can be resistors 4 and 5 respectively, the values of said resistors being preferably identical. The second terminal 13 of the source 3 is connected to ground and to each terminal 1 and 2 by means of a capacitor 6 and a capacitor 7 respectively, said capacitors being preferably such as to have identical values. Controllable means for producing a short-circuit between the terminals of said capacitors at a given instant and in a very short time are mounted in parallel with each capacitor. Said controllable means can be constituted respectively by spark-gaps 8 and 9 which are controlled either electrically or optically by an element 10. In the case of optical control, the element 10 can comprise at least one triggered laser generator, the emission beam of which is focused between the two electrodes of the spark-gaps. The element 10 is capable of triggering the two spark-gaps 8 and 9 in succession with a time interval which can vary between a few nanoseconds and several hundreds of microseconds.

The generator according to the invention operates as follows in the event that the resistors 4 and 5 have values which are identical and equal to R and that the capacitors 6 and 7 have values which are identical and equal to C : (U will designate the potential difference which exists between the terminals 12 and 13 of the direct-current voltage source 3).

At the instant $T=0$, a load which can be a Kerr or Pockels electrooptical cell, for example, is connected between the terminals 1 and 2 of the generator; the potential difference which is applied to the terminals of said load is in that case zero.

At an instant $T=t_1$, one of the spark-gaps such as the spark-gap 8, for example, is triggered by means of the element 10; the capacitor 6 which is associated with the triggered spark-gap 8 discharges extremely rapidly within a time interval of the order of 1 nanosecond, for example, and the voltage at the terminal 1 undergoes an abrupt decrease having value which is equal to U; in consequence, the potential difference between the terminals 1 and 2 is in that case equal to U at the instant $t_1$ and decreases slowly as the capacitor 6 recharges with a time constant which is equal to RC.

At an instant $T = t_2$ such that the value $t_2 - t_1$ is distinctly lower than the time constant RC, the element 10 triggers the second spark-gap 9; there is then obtained at the terminal 2 a sudden voltage decrease which is equal, for example, to the value U as defined earlier.

The potential value of the terminal 1 is equal to U starting from the instant $t_1$, the potential value of the terminal 2 is equal to the value 0 up to the instant $t_2$ and to the value U from the instant $t_2$; the potential difference is therefore zero prior to the instant $t_1$, is equal to U between $t_1$ and $t_2$ and zero after $t_2$.

When the two spark-gaps have returned to the non-conducting state, the two capacitors 6 and 7 re-charge simultaneously with the same time constant KC; the voltages at the terminals 1 and 2 revert to their initial values, the difference between these values being substantially zero during re-charging of the capacitors.

As is readily apparent, voltage can be applied to the capacitors 6 and 7 by means of two separate directcurrent voltage sources; said capacitors can also be connected to said sources by means of resistors having separate values or by any other connection means in order that the voltages initially applied to the terminals 1 and 2 should have identical values.

The controllable devices which are associated with said connection means and serve to vary the voltages applied to the two terminals 1 and 2 in a similar manner can be constituted by capacitors which are associated with spark-gaps or by any other equivalent means.

The spark-gaps 8 and 9 can be triggered successively by a high-power laser beam which is focused between the spark-gap electrodes.

By way of example of application, a generator in accordance with the invention can be associated with an electrooptical cell and thus constitutes a device for triggering a laser cavity.

It should clearly be understood that the invention is not limited in any sense to the embodiment which has been described with reference to the accompanying drawings and which has been given solely by way of example.

In particular, it is possible without departing from the scope of the invention to modify certain arrangements or to replace any particular means by equivalent means.

What we claim is:

1. A pulse generator for obtaining between two terminals of a load a pulse having a very fast rise time and fall time, comprising a first potential source, two outputs for said source one connected to ground and the other connected to a first terminal, a second potential source two outputs for said second source one connected to ground and the other connected to a second terminal and two devices for high-speed circuit closure connected respectively between ground and said terminals, at least one of the closure devices being a spark-gap.

2. A pulse generator according to claim 1, wherein said potential sources are capacitors.

3. A pulse generator according to claim 1, wherein at least one of said spark-gaps has a laser triggering device.

4. A pulse generator according to claim 2, wherein each of said capacitors is associated with a load circuit comprising a constant-potential source and a resistor.

5. A pulse generator according to claim 4, wherein said load circuits comprise a common constant-potential source.

* * * * *